United States Patent
Matsumoto

(10) Patent No.: US 12,511,040 B2
(45) Date of Patent: Dec. 30, 2025

(54) MEMORY SYSTEM, FIRMWARE UPDATE METHOD, AND PROGRAM FIELD

(71) Applicant: Kioxia Corporation, Tokyo (JP)

(72) Inventor: Mariko Matsumoto, Kawasaki Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 50 days.

(21) Appl. No.: 18/591,489

(22) Filed: Feb. 29, 2024

(65) Prior Publication Data

US 2024/0302961 A1     Sep. 12, 2024

(30) Foreign Application Priority Data

Mar. 7, 2023   (JP) ................. 2023-034522

(51) Int. Cl.
    *G06F 3/06*     (2006.01)
(52) U.S. Cl.
    CPC .......... *G06F 3/0607* (2013.01); *G06F 3/0652* (2013.01); *G06F 3/0679* (2013.01)

(58) Field of Classification Search
    CPC ..... G06F 3/0607; G06F 3/0652; G06F 3/0679
    See application file for complete search history.

(56) References Cited

U.S. PATENT DOCUMENTS

| 8,463,986 B2 | 6/2013 | Yamazaki et al. |
| 10,884,947 B2 | 1/2021 | Bhatia et al. |
| 2016/0275011 A1 | 9/2016 | Tanaka |
| 2024/0103832 A1* | 3/2024 | Chandrasekaran ......... G06F 11/1433 |

* cited by examiner

*Primary Examiner* — Yong J Choe
(74) *Attorney, Agent, or Firm* — Foley & Lardner LLP

(57) ABSTRACT

A memory system is connectable to a host. The memory system comprises a semiconductor memory and a memory controller electrically connected to the semiconductor memory. The memory controller, upon receiving a command from the host, the command instructing to update one or more of the plurality of firmwares stored in the first block, change at least one of a plurality of firmwares stored in any one of a plurality of slots of a first block, and change an active slot information stored in a first area of the first block.

20 Claims, 12 Drawing Sheets

FIG. 12A

| BLOCK 1_1 (FOR STORING FW) | BLOCK 2_1 (FOR STORING FW) | BLOCK 3_1 (FOR STORING FW) |
|---|---|---|
| BLOCK 1_2 (FOR STORING FW) | BLOCK 2_2 (FOR STORING FW) | BLOCK 3_2 (FOR STORING FW) |
| BLOCK 1_3 (FOR STORING FW) | BLOCK 2_3 (FOR STORING FW) | BLOCK 3_3 (FOR STORING FW) |
| BLOCK 1_4 (FOR STORING FW) | BLOCK 2_4 (FOR STORING FW) | BLOCK 3_4 (FOR STORING FW) |
| BLOCK 1_5 (FOR USER DATA) | BLOCK 2_5 (FOR USER DATA) | BLOCK 3_5 (FOR USER DATA) |
| BLOCK 1_6 (FOR USER DATA) | BLOCK 2_6 (FOR USER DATA) | BLOCK 3_6 (FOR USER DATA) |
| BLOCK 1_7 (FOR USER DATA) | BLOCK 2_7 (FOR USER DATA) | BLOCK 3_7 (FOR USER DATA) |
| BLOCK 1_8 (FOR USER DATA) | BLOCK 2_8 (FOR USER DATA) | BLOCK 3_8 (FOR USER DATA) |
| BLOCK 1_9 (FOR USER DATA) | BLOCK 2_9 (FOR USER DATA) | BLOCK 3_9 (FOR USER DATA) |
| BLOCK 1_10 (FOR USER DATA) | BLOCK 2_10 (FOR USER DATA) | BLOCK 3_10 (FOR USER DATA) |
| BLOCK 1_11 (FOR USER DATA) | BLOCK 2_11 (FOR USER DATA) | BLOCK 3_11 (FOR USER DATA) |
| BLOCK 1_12 (FOR USER DATA) | BLOCK 2_12 (FOR USER DATA) | BLOCK 3_12 (FOR USER DATA) |

FIG. 12B

| BLOCK 1_1 (FOR STORING FW) | BLOCK 2_1 (FOR USER DATA) | BLOCK 3_1 (FOR USER DATA) |
|---|---|---|
| BLOCK 1_2 (FOR STORING FW) | BLOCK 2_2 (FOR USER DATA) | BLOCK 3_2 (FOR USER DATA) |
| BLOCK 1_3 (FOR STORING FW) | BLOCK 2_3 (FOR USER DATA) | BLOCK 3_3 (FOR USER DATA) |
| BLOCK 1_4 (FOR STORING FW) | BLOCK 2_4 (FOR USER DATA) | BLOCK 3_4 (FOR USER DATA) |
| BLOCK 1_5 (FOR USER DATA) | BLOCK 2_5 (FOR USER DATA) | BLOCK 3_5 (FOR USER DATA) |
| BLOCK 1_6 (FOR USER DATA) | BLOCK 2_6 (FOR USER DATA) | BLOCK 3_6 (FOR USER DATA) |
| BLOCK 1_7 (FOR USER DATA) | BLOCK 2_7 (FOR USER DATA) | BLOCK 3_7 (FOR USER DATA) |
| BLOCK 1_8 (FOR USER DATA) | BLOCK 2_8 (FOR USER DATA) | BLOCK 3_8 (FOR USER DATA) |
| BLOCK 1_9 (FOR USER DATA) | BLOCK 2_9 (FOR USER DATA) | BLOCK 3_9 (FOR USER DATA) |
| BLOCK 1_10 (FOR USER DATA) | BLOCK 2_10 (FOR USER DATA) | BLOCK 3_10 (FOR USER DATA) |
| BLOCK 1_11 (FOR USER DATA) | BLOCK 2_11 (FOR USER DATA) | BLOCK 3_11 (FOR USER DATA) |
| BLOCK 1_12 (FOR USER DATA) | BLOCK 2_12 (FOR USER DATA) | BLOCK 3_12 (FOR USER DATA) |

MEMORY SYSTEM, FIRMWARE UPDATE METHOD, AND PROGRAM FIELD

CROSS-REFERENCE TO RELATED APPLICATION

This application is based upon and claims the benefit of priority from Japanese Patent Application No. 2023-034522, filed Mar. 7, 2023, the entire contents of which are incorporated herein by reference.

FIELD

Embodiments described herein relate generally to a memory system, a firmware update method, and a program.

BACKGROUND

Memory systems including semiconductor memories such as NAND flash memories are used in various electronic devices. Such memory systems are, for example, solid state drives (SSD).

For example, a memory controller provided in the memory system can instruct (or command) various processes and operations on the NAND flash memory. The memory controller controls various processes and operations for the NAND flash memory based on firmware stored in the memory system (for example, in the NAND flash memory).

BRIEF DESCRIPTION OF THE DRAWINGS

FIG. 12A is a diagram schematically illustrating a configuration example of a memory block group in the comparative example.

FIG. 12B is a diagram schematically illustrating a configuration example of a memory block group in the embodiment.

DETAILED DESCRIPTION

Figure 1:
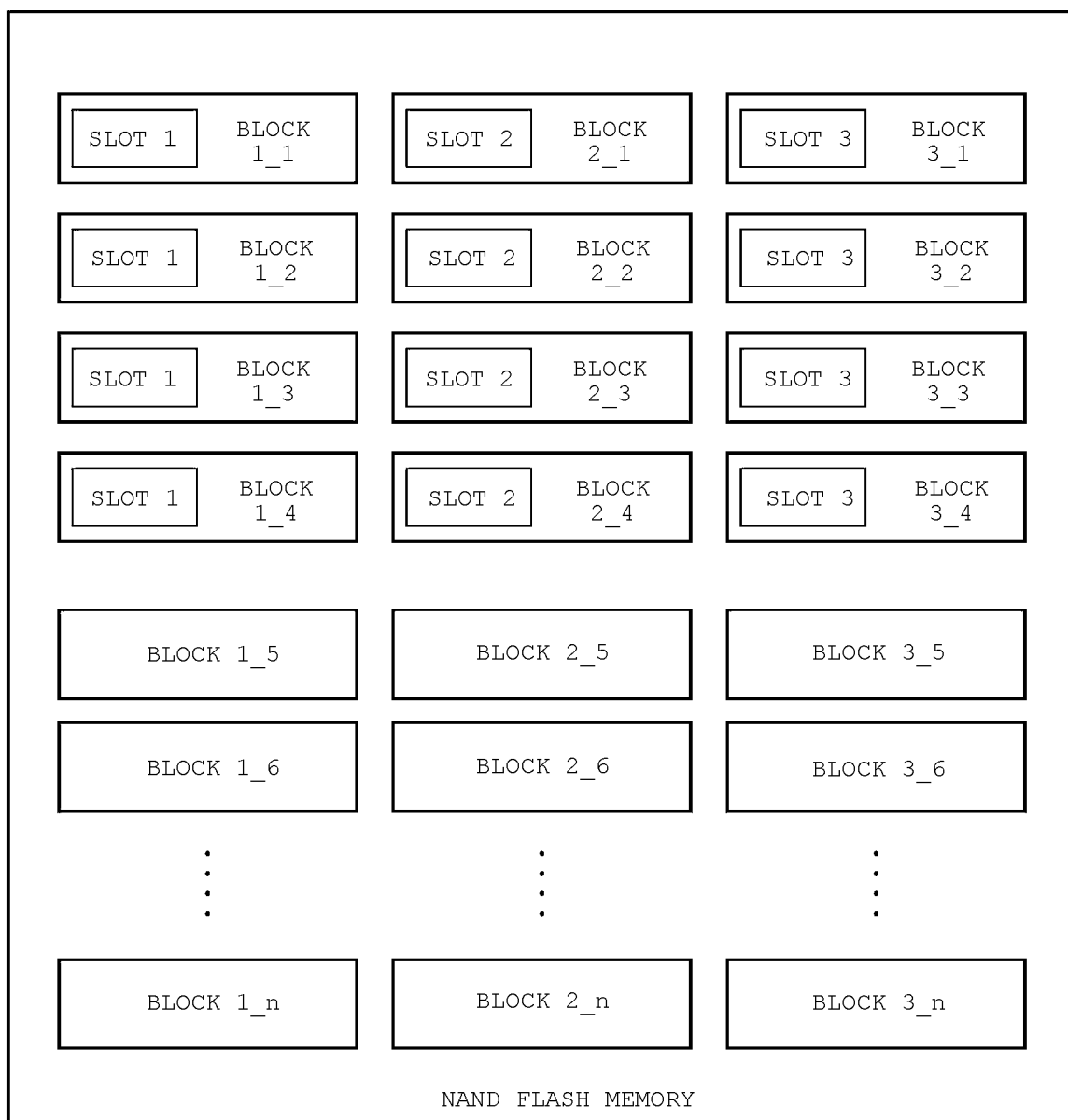
FIG. 1 is a diagram schematically illustrating a schematic configuration example of a memory block in a NAND flash memory of a comparative example.

Embodiments provide a memory system, a firmware update method, and a program capable of efficiently using memory blocks of a NAND flash memory when updating firmware and reducing the number of write blocks when updating the firmware to shorten a write time.

In general, according to one embodiment, a memory system is connectable to a host. The memory system comprises a semiconductor memory and a memory controller electrically connected to the semiconductor memory. The semiconductor memory includes a plurality of blocks, each of the plurality of the blocks being a unit of a data erase operation and including at least a first area and a plurality of slots, the plurality of blocks including at least a first block, the plurality of slots of the first block storing a plurality of firmwares respectively, the first area of the first block storing active slot information indicating an active slot among the plurality of slots of the first block. The memory controller is configured to, upon receiving a command from the host, the command instructing to update one or more of the plurality of firmwares stored in the first block, change at least one of the plurality of firmwares stored in any one of the plurality of slots of the first block, and change the active slot information stored in the first area of the first block.

Next, embodiments will be described with reference to the drawings. In the description of the specification or drawings described below, similar components are denoted by the same reference numerals, and descriptions thereof will be omitted. The drawings are schematic. Furthermore, the embodiments described below exemplify devices and methods for embodying the technical idea. Various changes can be made to the embodiments within the scope of the claims.

Embodiment

A memory system including a semiconductor memory such as a NAND flash memory (hereinafter also referred to as a NAND flash memory) executes various processes according to commands from a host device. A memory controller provided in the memory system controls the various processes and operations for the NAND flash memory based on firmware stored in the memory system (for example, in the NAND flash memory). The firmware is stored, for example, in a firmware slot (hereinafter also simply referred to as a slot) provided in a specific memory block (hereinafter also simply referred to as a block) of the NAND flash memory. In the NAND flash memory, the block is a unit of a data erase operation.

The memory controller generally uses a plurality of types of firmware properly according to the various executed operations.

Further, the same firmware is stored in a plurality of locations in the memory system, for example, in order to improve robustness. In the following, storing the same firmware in the plurality of locations in this manner will be referred to as "multiplexing firmware". For example, storing the same firmware in four locations is also referred to as "setting multiplicity of the firmware to 4".

For example, the memory controller executes update of the firmware according to an update request received from the host device. When the firmware is updated, operation contents controlled by the memory controller are changed according to the update of the firmware. In this specification, the firmware update includes two aspects of (i) firmware update in a narrow sense of changing the firmware in a slot and (ii) firmware update in a broad sense of changing a slot which is active (hereinafter also referred to as an active slot) while leaving the contents of the firmware in the slot unchanged. Herein, the active slot is a slot in which currently executed firmware is stored.

FIG. 1 schematically illustrates an example of a schematic configuration of a memory block of a NAND flash memory 20C in a comparative example. In the example illustrated in FIG. 1, 12 slots are provided to increase the multiplicity of each of the three types of firmware to 4. That is, in order to allow the multiplicity of each firmware for three slots to be 4, one slot is provided per block, and a total of 12 blocks are allocated for storing the firmware. In other words, the minimum number of blocks needed to be allocated is the multiplicity (here, 4) multiplied by the number of slots (here, 3).

More specifically, a slot 1 for storing the first type of the firmware among the three types is provided in each of four blocks 1_1 to 1_4. Similarly, a slot 2 for storing the second type of the firmware among the three types is provided for each of four blocks 2_1 to 2_4, and a slot 3 for storing the third type of the firmware is provided for each of four blocks 3_1 to 3_4. The four pieces of firmware stored in the four slots 1 are all the same firmware. The four pieces of firmware stored in the four slots 2 are all the same firmware. The four pieces of firmware stored in the four slots 3 are all the same firmware. Note that the firmware stored in slot 1 may be different from the firmware stored in slot 2 and the firmware stored in slot 3, or may be the same firmware. The firmware stored in slot 2 may be different from the firmware stored in slot 3, or may be the same firmware.

It is noted that blocks 1_5 to 1_n, blocks 2_5 to 2_n, and blocks 3_5 to 3_n (n is a natural number of 7 or larger) are blocks for user data. Herein, the block for the user data is, for example, a block for the reading and writing of data by the host device.

Figure 2A:
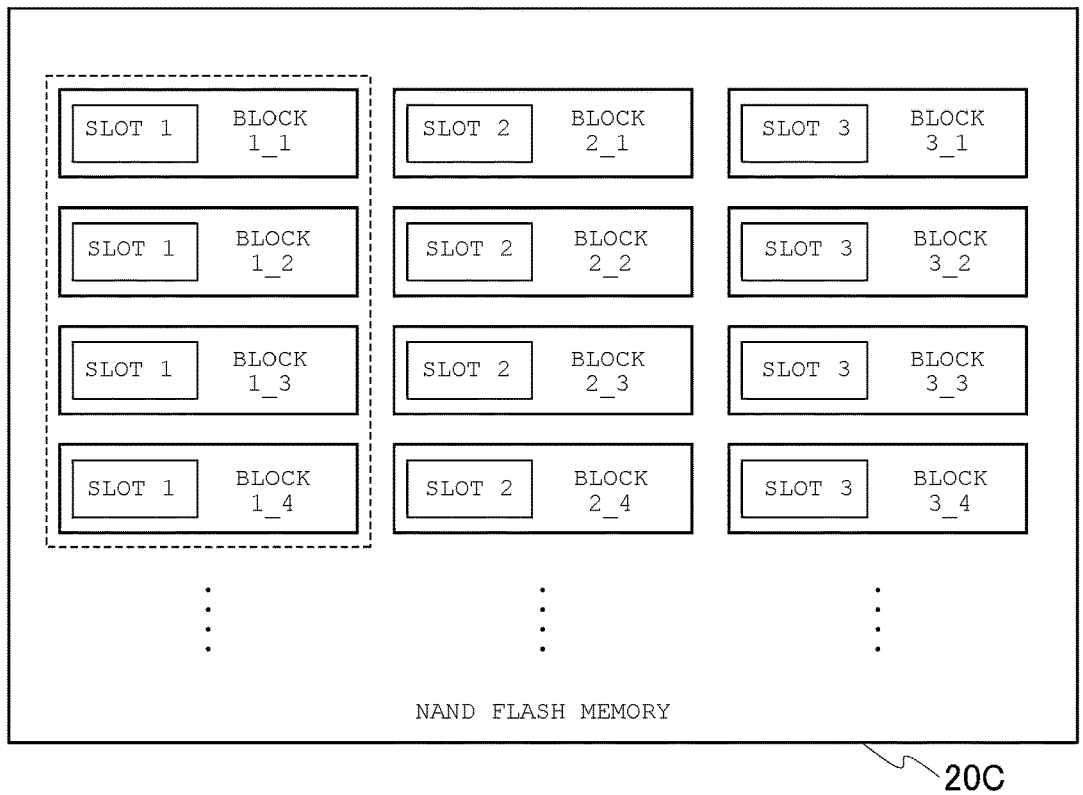
FIG. 2A is a diagram schematically illustrating an example of a memory block provided with an active slot in the NAND flash memory of the comparative example.
Figure 2B:
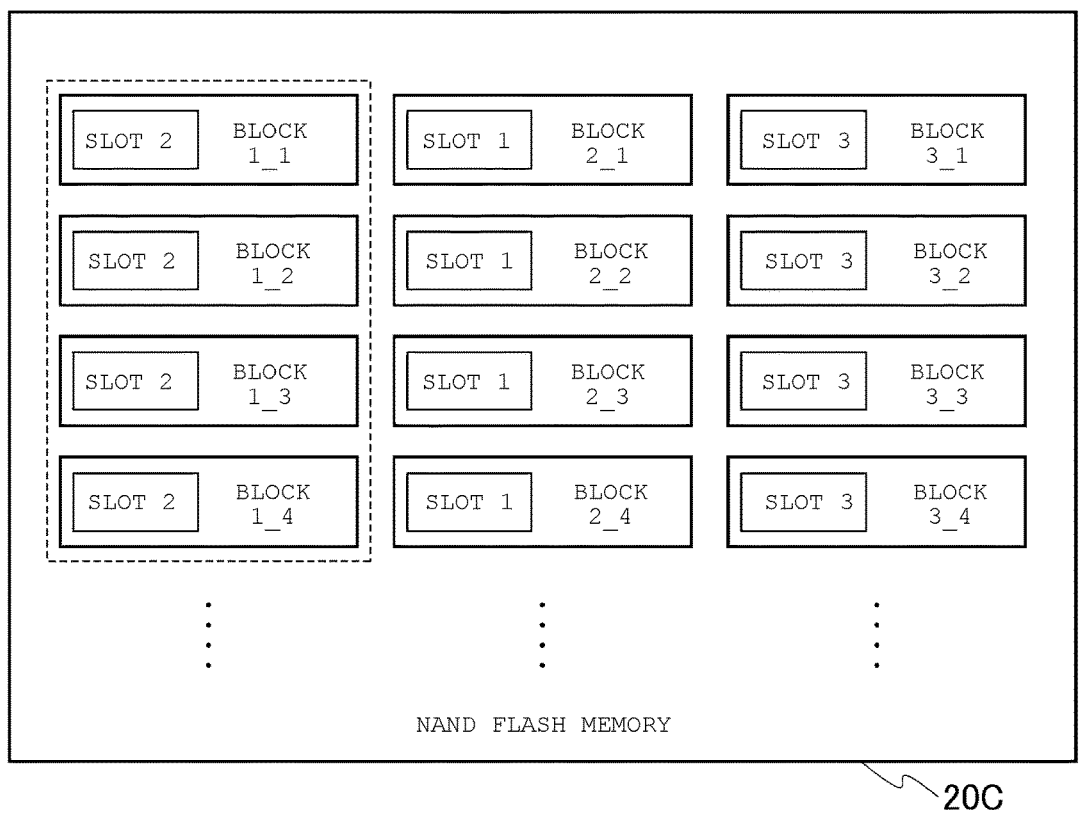
FIG. 2B is a diagram schematically illustrating an example of changing the active slot in the NAND flash memory of the comparative example.

FIG. 2A schematically illustrates an example of the blocks 1_1 to 1_4 in which slot 1, which is an active slot, is provided in the NAND flash memory 20C illustrated in FIG. 1. FIG. 2B schematically illustrates an example of changing the active slot in the NAND flash memory 20C illustrated in FIG. 2A.

In the example illustrated in FIGS. 2A and 2B, it is determined in advance (for example, at the time of design) that the active slot will be provided in the specific blocks 1_1 to 1_4. That is, in the example of FIG. 2A, the slots provided in the blocks 1_1 to 1_4 are fixedly recognized as the active slot. The reason why the active slot is provided in the specific blocks 1_1 to 1_4 is that it is difficult to determine a location to save information indicating which block is the active slot. That is, when the information indicating the active slot is stored in each of the 12 blocks 1_1 to 1_4, 2_1 to 2_4, and 3_1 to 3_4, for example, even when only the active slot is to be changed, there is a need that a write process is to be performed on all the 12 blocks. Furthermore, when one block is allocated exclusively for storing the information indicating the active slot, there is a need to perform the write process on that exclusive block, which leads to the increase in the number of write processes thereon.

In the comparative example illustrated in FIG. 2B, in order to change the active slot from slot 1 to slot 2, the data stored in each of the blocks 1_1 to 1_4 and the data stored in each of the blocks 2_1 to 2_4 needs to be swapped. For this reason, an update process (write process) for the total of eight blocks 1_1 to 1_4 and 2_1 to 2_4 needs to be performed. When performing such an update process on the NAND flash memory, the process of backing up the data stored in each block to another block, performing the data erase operation on the original block, and writing the backed-up data back to the original block needs to be performed.

Further, the size of the firmware is, for example, one-third or less of the block size of the NAND flash memory. Therefore, when one slot is provided per block, the memory area of the block cannot be used efficiently. Since block sizes tend to increase, efficient use of the blocks is required.

(Memory System According to Embodiment)

Figure 3:
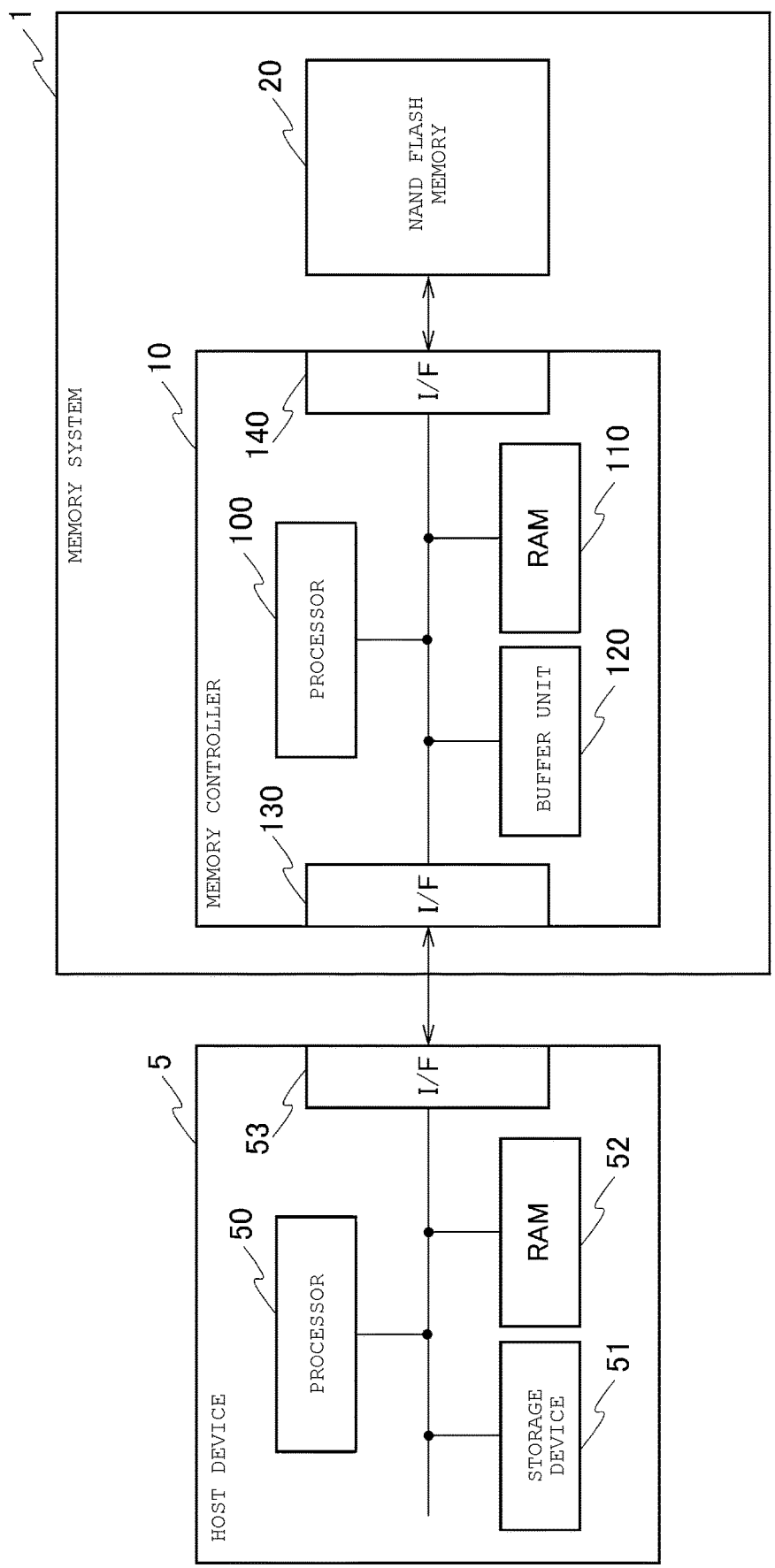
FIG. 3 is a block diagram schematically illustrating an example of a configuration of a memory system and a host device according to an embodiment.
Figure 4:
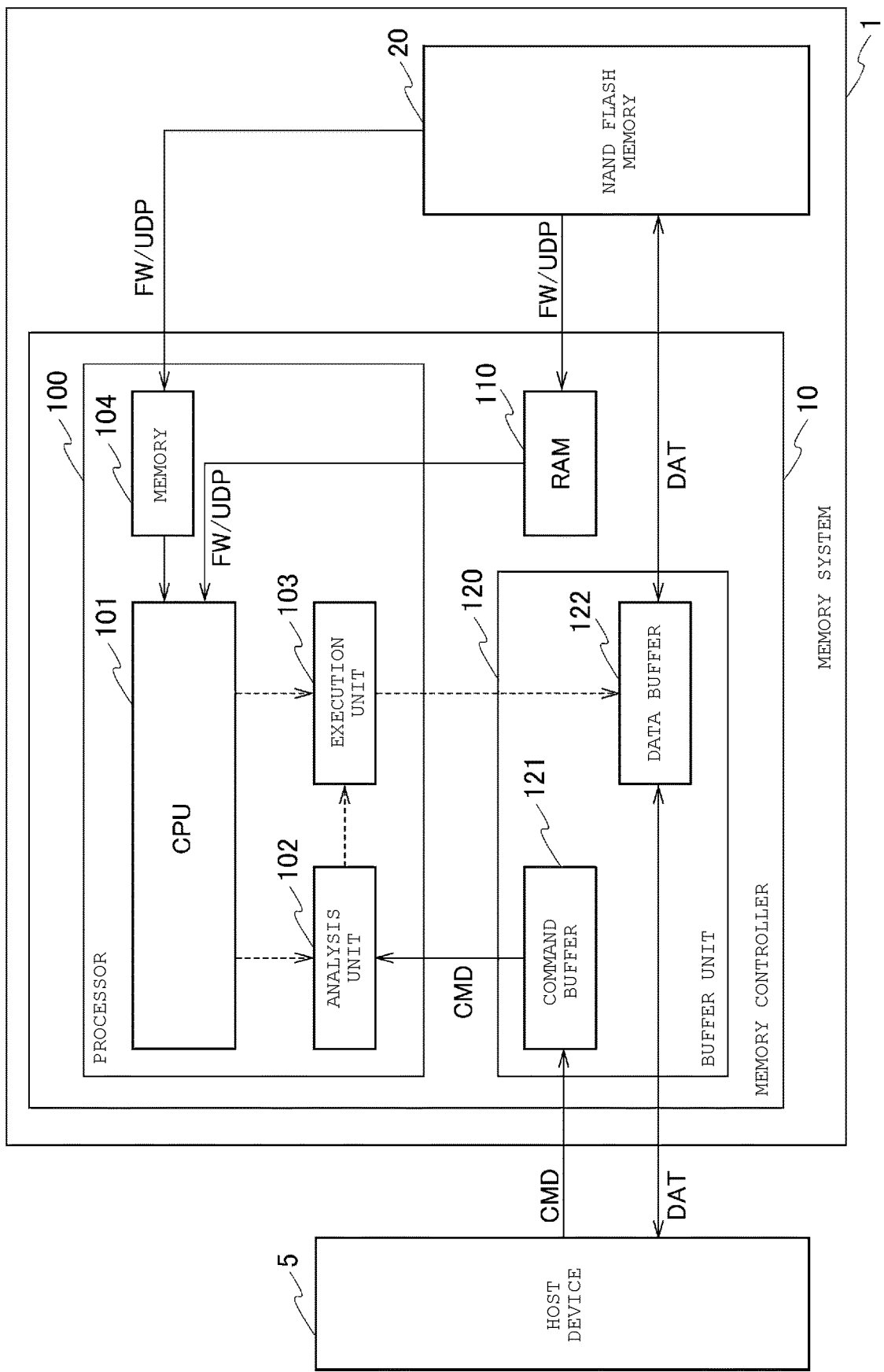
FIG. 4 is a block diagram schematically illustrating an example of an internal configuration of a memory controller according to the embodiment.

FIG. 3 schematically illustrates an example of a schematic configuration of a memory system 1 and a host device 5 according to the embodiment. Further, FIG. 4 schematically illustrates an example of an internal configuration of a memory controller 10 provided in the memory system 1 illustrated in FIG. 3.

The memory system 1 according to the embodiment performs a data write operation, a data read operation, a data erase operation, or the like, in the memory system 1 according to a request from the host device 5.

The host device 5 includes a processor 50, a storage device 51, a random access memory (RAM) 52, and an interface circuit (I/F) 53. The host device 5 is, for example, a server, a personal computer, a smartphone, a feature phone, a mobile terminal (for example, a tablet terminal), a game device, an information appliance, an in-vehicle device, a router, or a base station.

The processor 50 controls various processes and operations of the host device 5. The processor 50 issues a command CMD for requesting (for example, commanding and instructing) various processes and operations to the memory system 1.

The storage device 51 is a storage device such as a hard disc drive (HDD). The RAM 52 functions as a work area for various data processes by the processor 50.

The interface circuit 53 communicates with the memory system 1 based on predetermined interface standard and/or communication protocol. It is noted that the command CMD from the host device 5 to the memory system 1 is based on the interface standard to which the interface circuit 53 conforms. For example, the interface standard (or communication protocol) to which the interface circuit 53 conforms is a serial attached SCSI (SAS) standard, a serial ATA (SATA) standard, a PCIexpress (registered trademark) standard, an NVM Express (registered trademark) standard, or a universal flash storage standard. It is noted that the interface circuit 53 may conform to other interface standards than those exemplified here.

The memory system 1 according to the embodiment includes the memory controller 10 and the NAND flash memory 20.

The memory controller 10 instructs the NAND flash memory 20 to perform various processes and operations such as a data write operation, a data read operation, and a data erase operation with respect to the NAND flash memory 20 according to the command CMD from the host device 5. The memory controller 10 may be configured with a large-scale integrated circuit (LSI) or a system-on-a-chip (SoC). The functions of each component of the memory controller 10 may be implemented by dedicated hardware, a processor that executes the program, or a combination thereof.

The memory controller 10 includes a processor 100, a RAM 110, a buffer unit 120, and interface circuits (I/F) 130 and 140.

The processor 100 instructs and commands the NAND flash memory 20 to perform various processes and operations. For example, the processor 100 generates a command indicating an instruction to the NAND flash memory 20. The processor 100 controls various processes and operations on the NAND flash memory 20, for example, in accordance with the firmware stored in the memory system 1 (for example, in a memory area of the NAND flash memory 20).

As illustrated in FIG. 4, the processor 100 includes a CPU 101, an analysis unit 102, an execution unit 103, and a memory 104. Through these components, the processor 100 implements the function for executing the command CMD from the host device 5, the function for updating firmware, and the like.

The CPU 101 controls various processes executed in the processor 100 and various operations in the processor 100. The analysis unit 102 analyzes the command CMD from the host device 5. The execution unit 103 executes the operation based on the analysis result of the command CMD. The functions of the analysis unit 102 and the execution unit 103 may be implemented by dedicated hardware (circuits), or may be implemented by the CPU 101 executing software (programs).

The RAM 110 functions as a work area for various processes and operations by the processor 100 in the memory controller 10. The RAM 110 temporarily stores firmware FW, a program UDP, data, or the like used for various processes by the processor 100. For example, the RAM 110 is accessed by the CPU 101 and the execution unit 103. It is noted that the memory 104 having the same function and configuration as the RAM 110 may be provided in the processor 100. The program UDP is a firmware update program according to this embodiment. The program UDP is stored in the NAND flash memory 20, and when the memory controller 10 updates the firmware FW, the program UDP is loaded from the NAND flash memory 20 to the RAM 110 or the memory 104. The memory controller 10 executes the program UDP loaded into the RAM 110 or the memory 104 to update the firmware FW. It is noted that the program UDP may be a portion of the firmware FW.

The buffer unit 120 temporarily stores data transferred between the memory controller 10 and the host device 5 and data transferred between the memory controller 10 and the NAND flash memory 20. For example, the buffer unit 120 includes a command buffer 121 and a data buffer 122.

The command buffer 121 temporarily stores the command CMD from the host device 5. The data buffer 122 temporarily stores data DAT transferred between the memory controller 10 and the host device 5 and data DAT transferred between the memory controller 10 and the NAND flash memory 20.

The interface (I/F) circuit 130 transfers data between the host device 5 and the memory controller 10 based on the predetermined interface standard. The interface standard (and communication protocol) to which the interface circuit 130 conforms is the same as the interface standard to which the interface circuit 53 of the host device 5 conforms.

The interface (I/F) circuit 140 performs communication (for example, data transfer) between the memory controller 10 and the NAND flash memory 20 based on a NAND interface standard.

When the memory controller 10 instructs the NAND flash memory 20 to perform a certain operation, the memory controller transmits data DAT containing commands and address information to the NAND flash memory 20. It is noted that, when the memory controller 10 instructs the NAND flash memory 20 to write data, the data DAT further includes write data. It is noted that, in addition to the above-mentioned configuration, the memory controller 10 may include other configurations such as an error-correction-code (ECC) circuit (not illustrated).

The NAND flash memory 20 is a non-volatile semiconductor memory device. The NAND flash memory 20 can store data and firmware in substantially non-volatile manner.
(Block Configuration of NAND Flash Memory)

Figure 5:
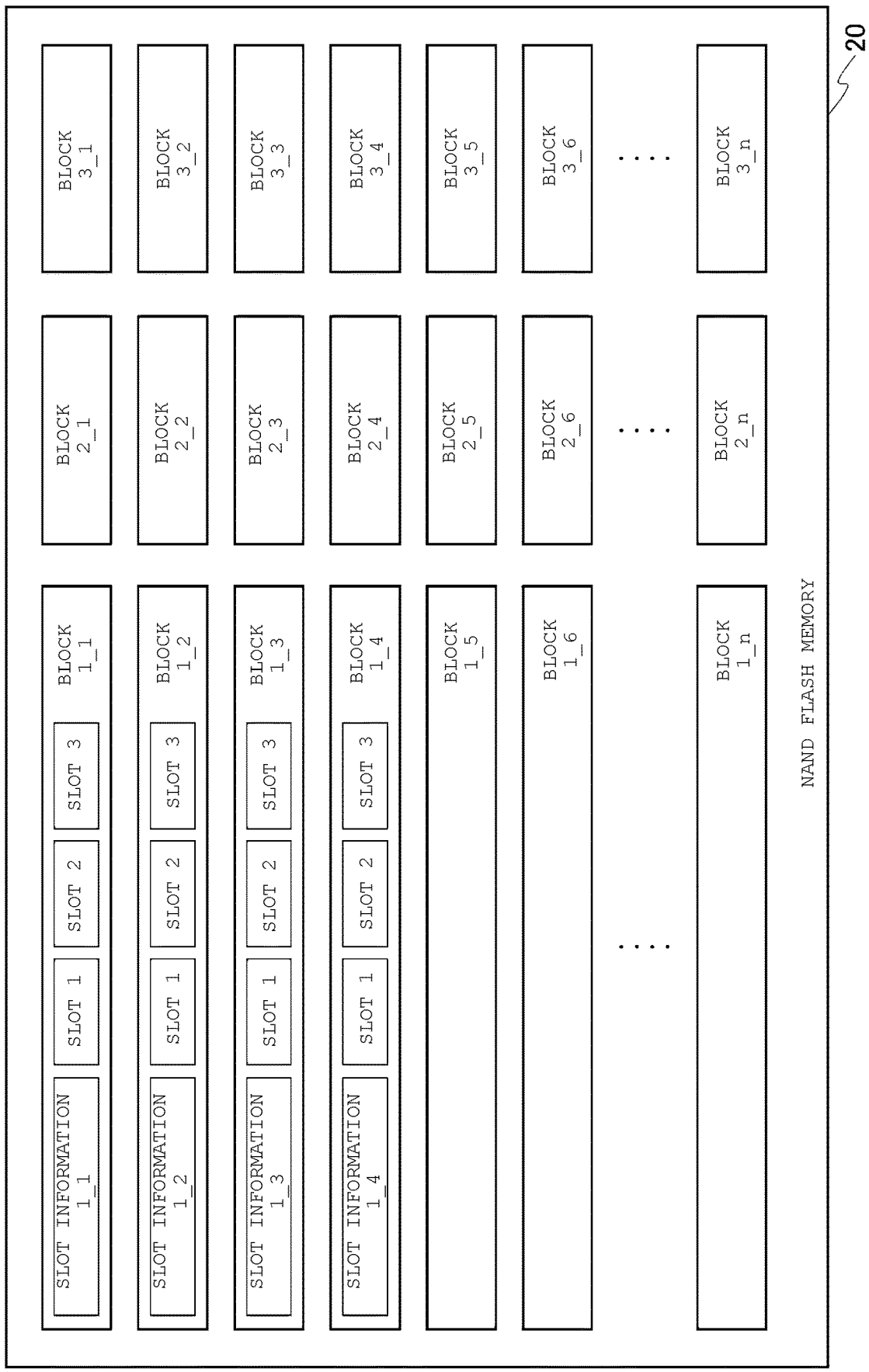
FIG. 5 is a diagram schematically illustrating an example of a configuration of a memory block in a NAND flash memory according to the embodiment.

FIG. 5 schematically illustrates an example of a configuration of the memory block in the NAND flash memory 20 according to the embodiment. In the NAND flash memory 20 in the embodiment, one block is provided with the plurality of slots for storing the plurality of types of firmware and an area for storing the information on the active slot (hereinafter also referred to as active slot information).

In the example illustrated in FIG. 5, three slots 1 to 3 for storing three types of the firmware and the area for storing the active slot information are provided in one block. In order to set the multiplicity of each firmware for three slots to be 4, four blocks 1_1 to 1_4 are allocated for storing the firmware. That is, in this embodiment, the number of blocks needed to be allocated is the multiplicity (4, in this case).

More specifically, the first block 1_1 among the blocks for the multiplicity of 4 is provided with the slots 1 to 3 for storing three types of the firmware, and further stores the active slot information 1_1. Similarly, the second block 1_2 among the blocks for the multiplicity of 4 is provided with the slots 1 to 3 for storing three types of the firmware, and further stores the active slot information 1_2. The third block 1_3 among the blocks for the multiplicity of 4 is provided with the slots 1 to 3 for storing three types of the firmware, and further stores the active slot information 1_3. The fourth block 1_4 among the blocks for the multiplicity 4 is provided with the slots 1 to 3 for storing three types of the firmware, and further stores the active slot information 1_4. The four pieces of firmware stored in the four slots 1 of the blocks 1_1 to 1_4 are all the same firmware. Similarly, all four pieces of firmware stored in the four slots 2 are the same firmware. The four pieces of firmware stored in the four slots 3 are all the same firmware. Note that, the firmware stored in slot 1 may be different from the firmware stored in slot 2 and the firmware stored in slot 3, or may be the same firmware. The firmware stored in slot 2 may be different from the firmware stored in slot 3, or may be the same firmware.

It is noted that the blocks 1_5 to 1_n, the blocks 2_1 to 2_n, and the blocks 3_1 to 3_n (n is a natural number of 7 or larger) are blocks for the user data. Herein, the block for the user data is, for example, a block for the reading and writing of data by the host device 5.

Figure 6:
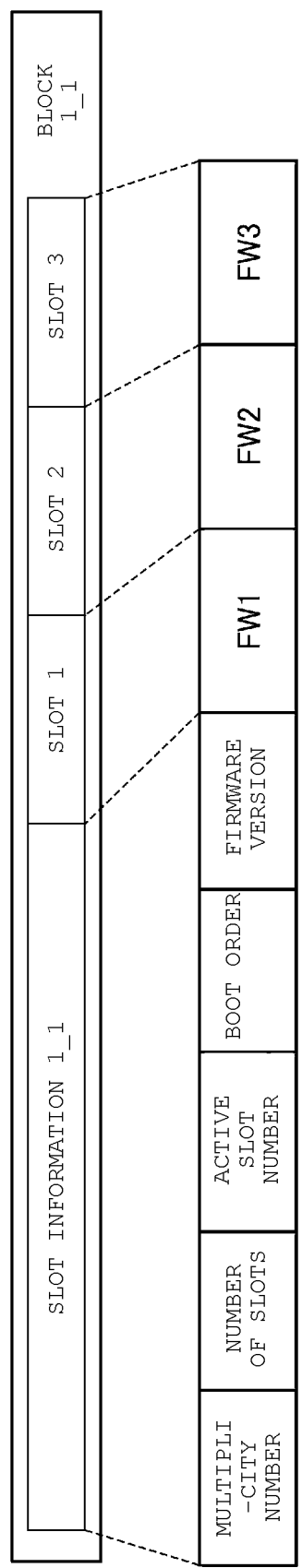
FIG. 6 is a diagram schematically illustrating an example of an internal configuration of a memory block provided with a slot for storing the firmware according to the embodiment.

FIG. 6 schematically illustrates an example of the internal configuration of the block 1_1, which is provided with the slot for storing the firmware, among the memory blocks illustrated in FIG. 5. The block 1_1 stores the active slot information 1_1 and is further provided with the slots 1 to 3.

The active slot information 1_1 includes a multiplicity number, the number of slots, an active slot number, boot order information in the case of the booting failure, firmware version information, and the like. For example, when the current active slot is slot 1, the multiplicity number of is set to "4", the number of slots is set to "3", the active slot number is set to "1", and the boot order information in the case of the booting failure is set to "2→3", in the active slot information 1_1. Herein, the "boot order in the case of the booting failure" indicates the slot number of the firmware to be booted next when the booting of the firmware in the current active slot 1 fails. When the current active slot is slot 1, the next slot for the firmware to be booted is slot 2, and when the booting of the firmware in the slot 2 also fails, the slot for the next firmware to be booted is slot 3. It is noted that among the active slot information, information other than the active slot number is optional information.

(Firmware Update)

Figure 7:
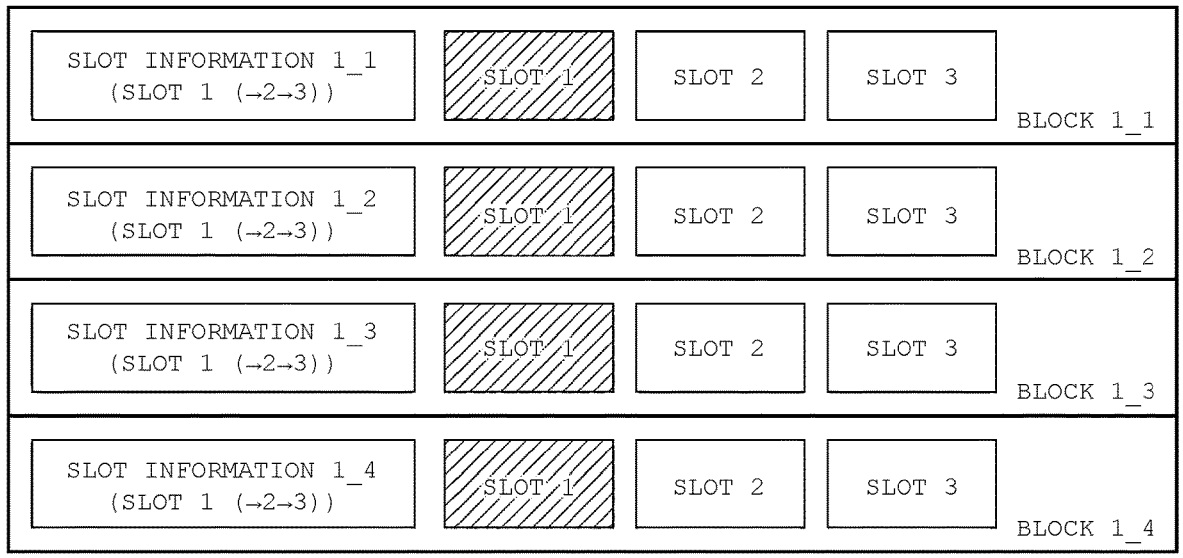
FIG. 7 is a diagram schematically illustrating an example of changing firmware stored in the slot in the memory block according to the embodiment.

FIG. 7 schematically illustrates an example of changing the firmware stored in slot 1 in the memory blocks 1_1 to 1_4 illustrated in FIG. 5.

As illustrated in FIG. 7, when changing the firmware stored in slot 1 (in other words, in the case of the firmware update in the narrow sense), the firmware stored in slot 1 and the active slot information of each of the blocks 1_1 to 1_4 are changed. That is, the blocks that need to be rewritten are only four blocks of the blocks 1_1 to 1_4. When rewriting the four blocks 1_1 to 1_4, the memory controller 10 backs up the data stored in each block to another block, performs the data erase operation on the blocks 1_1 to 1_4, and after that, writes the backed-up data back to the blocks 1_1 to 1_4.

In FIG. 7, the numbers in parentheses "( )" in the active slot information indicate the active slot number and the boot order in the case of the booting failure. That is, in FIG. 7, "(slot 1 (→2→3))" indicates that the active slot is slot 1, and the boot order in the case of the booting failure is the order of slot 2 and slot 3.

In this manner, in the memory system 1 according to the embodiment, even when changing the firmware, the number of blocks needed to be rewritten is equal to the multiplicity number.

Figure 8:
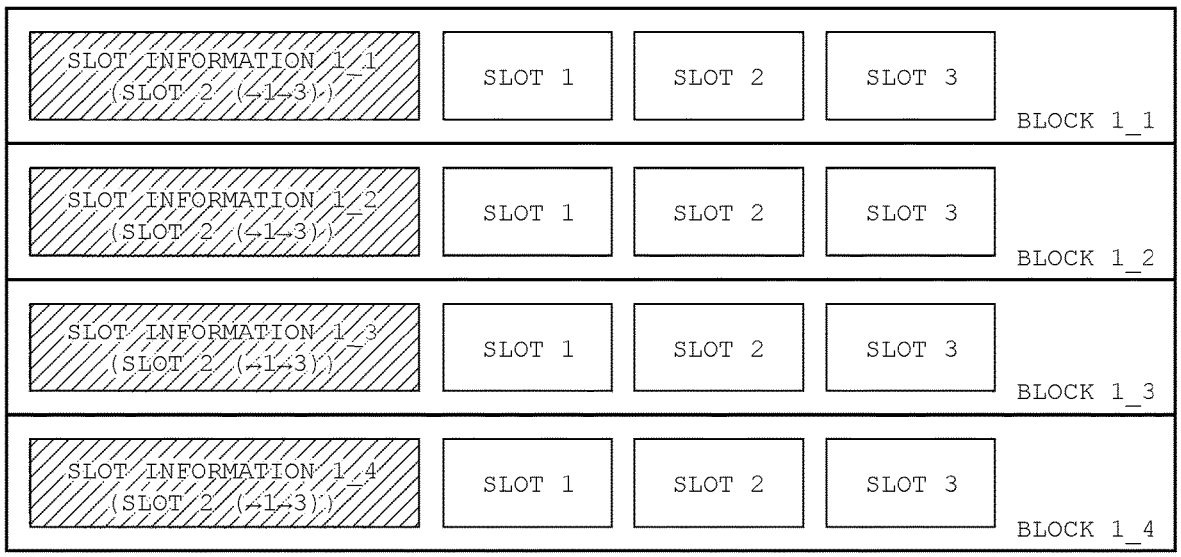
FIG. 8 is a diagram schematically illustrating an example of changing an active slot in the memory block according to the embodiment.

FIG. 8 schematically illustrates an example in which the active slot is changed from slot 1 to slot 2 in the memory blocks 1_1 to 1_4 illustrated in FIG. 5. In the example of FIG. 8, only the active slot is changed from slot 1 to slot 2 (that is, the firmware update in the broad sense), but the firmware itself is not changed.

As illustrated in FIG. 8, when changing the active slot from slot 1 to slot 2, the memory controller 10 changes the active slot number of the active slot information 1_1 to 1_4 of each block 1_1 to 1_4 from "1" to "2" and rewrites the four blocks 1_1 to 1_4. At this time, the memory controller 10 performs a rewrite process for each of the blocks 1_1 to 1_4, as in the case of the firmware update in the narrow sense described with reference to FIG. 7.

In this manner, in the memory system 1 according to the embodiment, even when changing the active slot, the number of blocks to be rewritten is equal to the multiplicity number.

It is noted that in the memory system 1 according to the embodiment, even when performing the firmware update in the narrow sense and the firmware update in the broad sense at the same time, the number of blocks needed to be rewritten is equal to the multiplicity number.

As described above, the memory system 1 according to the embodiment is connectable to the host device 5. The memory system 1 includes the semiconductor memory (NAND flash memory) 20 and the memory controller 10 electrically connected to the semiconductor memory 20. The semiconductor memory 20 includes a plurality of blocks, and each of the plurality of the blocks is a unit of a data erase operation. Each of the plurality of blocks includes at least a first area (for example, an area for storing the information on the active slot) and a plurality of slots (for example, the slots 1 to 3 in FIG. 5). The plurality of blocks includes at least a first block (for example, block 1_1 in FIG. 5). The plurality of slots of the first block stores a plurality of firmwares respectively. The first area of the first block stores the active slot information (for example, active slot information 1_1 in FIG. 5) indicating the active slot among the plurality of slots of the first block. The memory controller 10 is configured to, upon receiving the command CMD from the host device 5, the command CMD instructing to update one or more of the plurality of firmwares stored in the first block, change at least one among the plurality of firmwares stored in any one of the plurality of slots of the first block, and change the active slot information stored in the first area of the first block.

(Firmware Update Process)

Next, a procedure of a firmware update process in the memory system 1 according to this embodiment will be described. In the firmware update process described below, a case is explained in which an NVM Express (registered trademark) standard (NVM Express TM Revision 1.4, [on-line], Jun. 10, 2019) [searched on Jan. 10, 2023] and the Internet <https://nvmexpress.org/wp-content/uploads/NVM-Express-1_4-2019.06.10-Ratified.pdf>) is used as the interface standard between the host device 5 and the memory system 1, among the above-mentioned interface standards.

Further, a portion or all of the firmware update process described below can be realized in a computer program as instructions to cause a computer to execute the firmware update process. The computer program is stored, for example, in a non-transitory computer readable medium, and is used by the controller 10 of the memory system 1 according to the embodiment. This computer program is stored in the NAND flash memory 20, for example. Further, this computer program may be included in the firmware stored in each slot.

Figure 9:
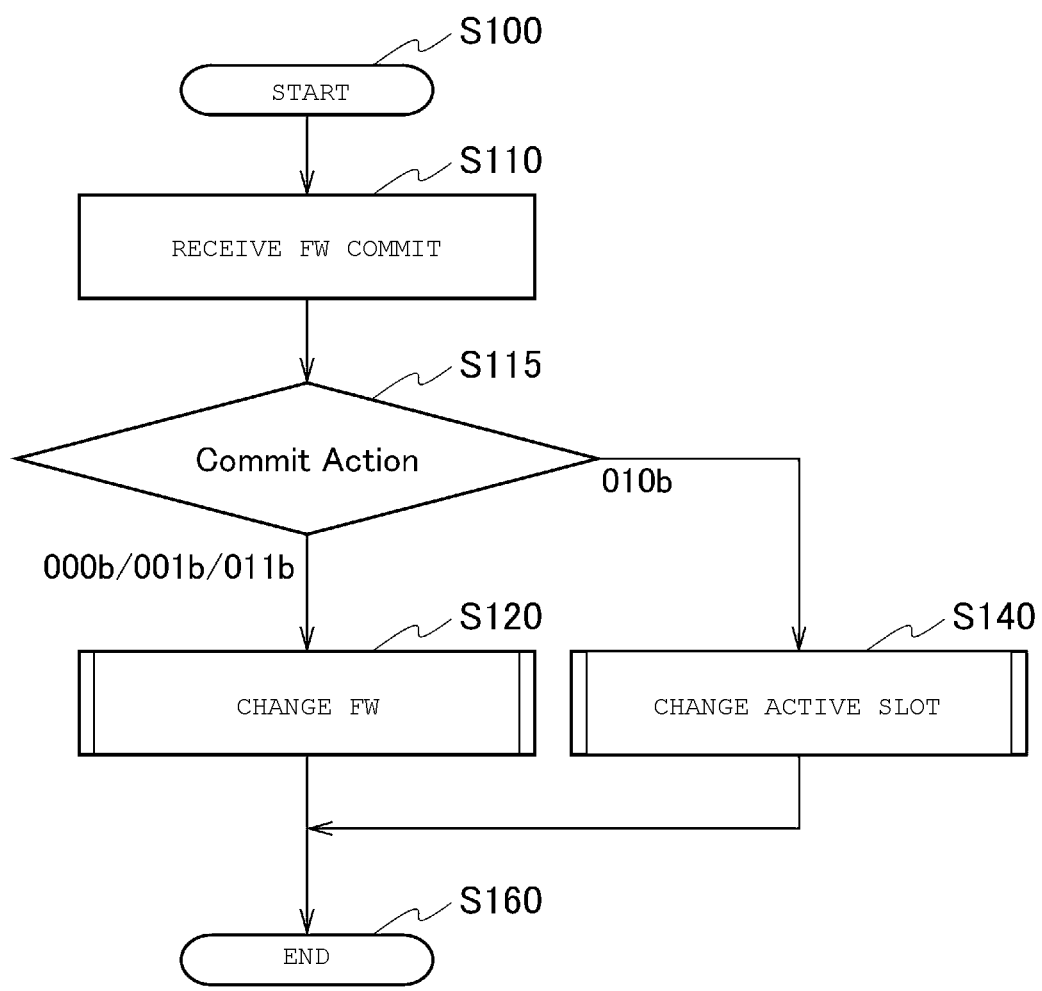
FIG. 9 is a flowchart illustrating an example of a procedure of a firmware update process according to the embodiment.
Figure 10:
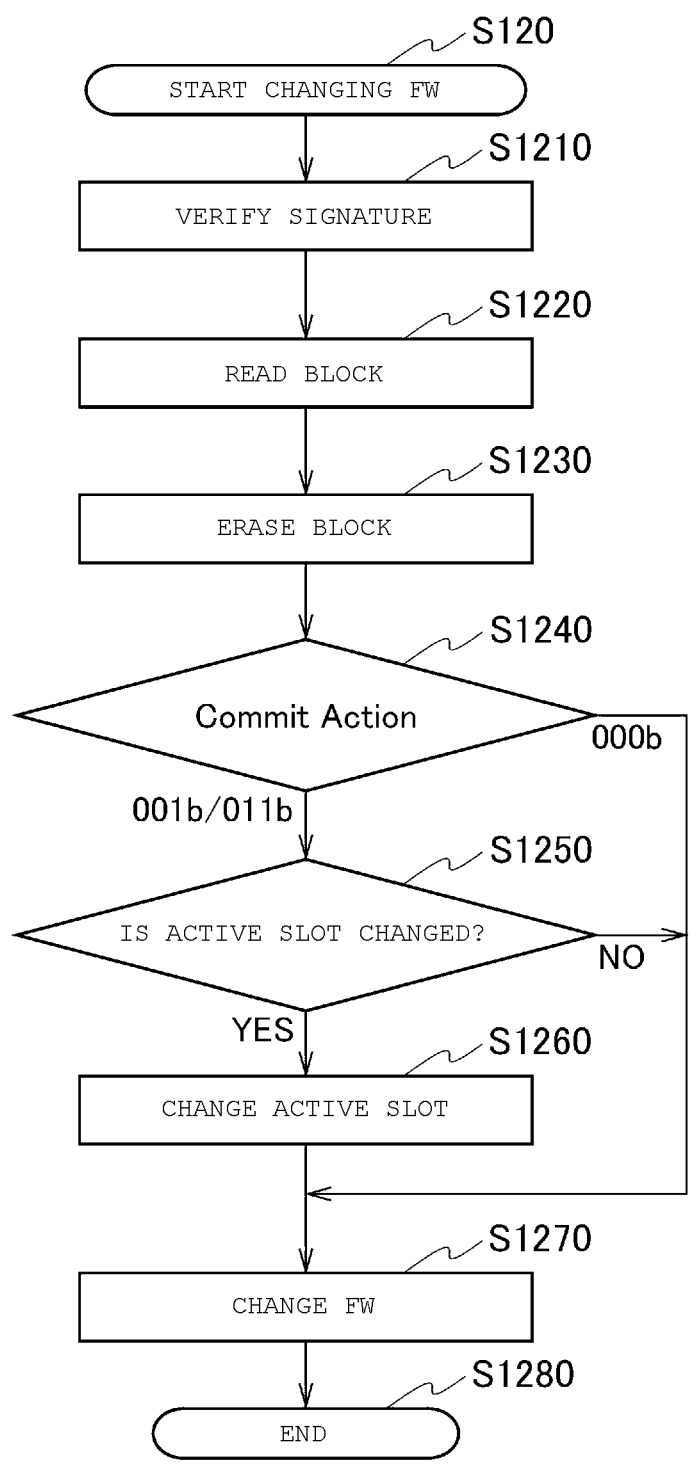
FIG. 10 is a flowchart illustrating an example of a procedure for a firmware change process according to the embodiment.
Figure 11:
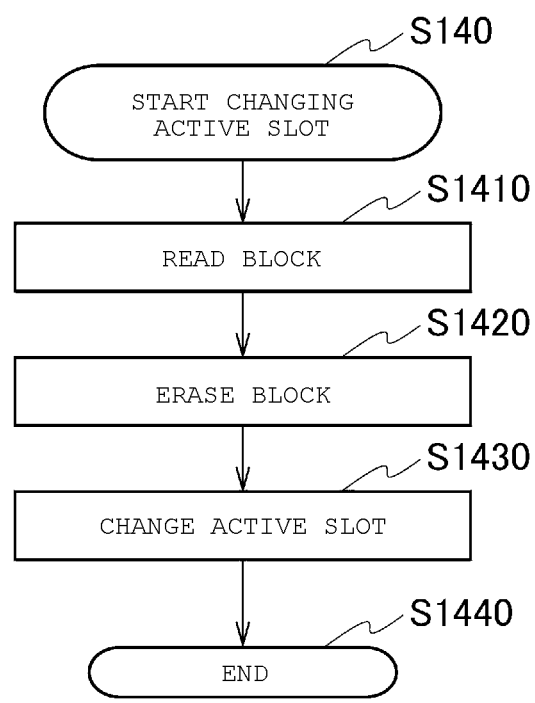
FIG. 11 is a flowchart illustrating an example of the procedure for an active slot change process according to the embodiment.

FIG. 9 illustrates an example of a procedure of the firmware update process according to this embodiment. Further, FIG. 10 illustrates an example of a procedure of a firmware change process (that is, the firmware update process in the narrow sense) among the procedures of the firmware update process illustrated in FIG. 9. FIG. 11 illustrates an example of a procedure of an active slot change process (that is, firmware update process in the broad sense) among procedures of the firmware update process illustrated in FIG. 9.

In step S100 in FIG. 9, processing is started according to an action (for example, a commit action) from the host device 5 to the memory system 1.

In step S110, the memory controller 10 receives a firmware commit command CMD transmitted from the host device 5 to the memory system 1. The firmware commit command CMD is temporarily stored, for example, in the command buffer 121 of the buffer unit 120. Further, when the firmware commit command CMD instructs to change the firmware itself, the host device 5 transmits the updated firmware and information for identifying the updated firmware to the memory system 1. The updated firmware and the information for identifying the updated firmware are temporarily stored, for example, in the data buffer 122 of the buffer unit 120.

In step S115, the analysis unit 102 analyzes the contents of the firmware commit command CMD stored in the command buffer 121.

As a result of the analysis by the analysis unit 102 in step S115, when the firmware commit command CMD includes one of "000b", "001b", or "011b" (i.e., firmware change instruction) as the commit action, the process by the memory controller 10 proceeds to step S120, and the execution unit 103 of the processor 100 executes the firmware change process.

As a result of the analysis in step S115, when the firmware commit command CMD includes "010b" (i.e., active slot change instruction) as the commit action, the process proceeds to step S140, and the execution unit 103 executes the active slot change process.

When the firmware change process in step S120 or the active slot change process in step S140 is completed, a series of processes ends in step S160.

(Firmware Change)

Next, the specific procedure of the firmware change process in step S120 will be described with reference to FIG. 10.

In step S1210, for example, the execution unit 103 in the processor 100 verifies a signature attached to the updated firmware transmitted from the host device 5. This signature is used to verify whether the updated firmware transmitted from the host device 5 is safe and correct. When a signature verification process is performed correctly, the process proceeds to step S1220. When the signature verification process is not performed correctly, the memory controller 10 skips each of the subsequent steps S1220 to S1270 and ends the process (step S1280).

In step S1220, the execution unit 103 performs a read process on the blocks 1_1 to 1_4 in order to change the firmware. The data read from the blocks 1_1 to 1_4 is saved to an empty block of the NAND flash memory 20, or to the data buffer 122 or the RAM 110 in the memory controller 10. It is noted that, since the same data is stored in each of the blocks 1_1 to 1_4, the execution unit 103 may perform the read process on the blocks 1_1 to 1_4 in parallel, reconstruct data for one block by using the data read from these four blocks, and save the reconstructed data for one block. Alternatively, the execution unit 103 may perform the read process on only one of the blocks 1_1 to 1_4.

In step S1230, the execution unit 103 executes an erase process on the blocks 1_1 to 1_4.

In step S1240, based on the analysis result in step S115, when the firmware commit command CMD includes either "001b" or "011b" as the commit action, the process proceeds to step S1250. When the firmware commit command CMD includes "000b" as the commit action, the process proceeds to step S1270.

In step S1250, the analysis unit 102 determines whether the change of the current firmware involves a change in the active slot. As a result of the determination in step S1250, when the change of the active slot is involved, the process proceeds to step S1260. As a result of the determination in step S1250, when the change of the active slot is not involved, the process proceeds to step S1270.

In step S1260, the execution unit 103 executes the active slot change process for the blocks 1_1 to 1_4 by using the saved data. The active slot change process is, for example, the process described with reference to FIG. 8.

In step S1270, the execution unit 103 executes the firmware change process on the blocks 1_1 to 1_4 by using the saved data and the updated firmware. The firmware change process is, for example, a process described with reference to FIG. 7.

Then, in step S1280, a series of processes ends.

It is noted that the execution unit 103 may perform the processes from step S1230 to step S1270 for one block at the time. That is, the execution unit 103 performs the processes from step S1230 to step S1270 on the block 1_1, then performs the processes from step S1230 to step S1270 on the block 1_2, then performs the processes from step S1230 to step S1270 on the block 1_3, and then performs the processes from steps S1230 to S1270 on the block 1_4.

(Active Slot Change)

Next, a specific procedure of the active slot change process in step S140 will be described with reference to FIG. 11.

In step S1410, the execution unit 103 performs the read process for the blocks 1_1 to 1_4 in the same manner as the process in step S1220 described with reference to FIG. 10 in order to change the active slot. The data read from the blocks 1_1 to 1_4 is saved to an empty block of the NAND flash memory 20, or to the data buffer 122 or the RAM 110 in the memory controller 10.

In step S1420, the execution unit 103 executes the erase process on the blocks 1_1 to 1_4.

In step S1430, the execution unit 103 executes the active slot change process for the blocks 1_1 to 1_4 by using the saved data. The active slot change process is a process described with reference to FIG. 8.

Then, in step S1440, a series of processes ends.

It is noted that the execution unit 103 may perform the processes of steps S1420 to S1430 for one block at the time.

(Operation and Effects)

According to this embodiment, the following effects are achieved.

(1) In the memory system 1 according to this embodiment, since the firmware for the plurality of slots is stored in one block, the number of blocks that need to be allocated for storing the firmware can be reduced.

FIG. 12A schematically illustrates an example of a configuration of a memory block group in the comparative example described with reference to FIGS. 1 and 2. FIG. 12B schematically illustrates an example of a configuration of a memory block group in this embodiment.

As illustrated in FIG. 12A, in the comparative example, the 12 blocks of the blocks 1_1 to 1_4, 2_1 to 2_4, and 3_1 to 3_4, for storing the firmware need to be allocated.

In contrast, in the memory system 1 according to this embodiment, as illustrated in FIG. 12B, only four blocks of the blocks 1_1 to 1_4, need to be allocated for the firmware storage. Therefore, in the memory system 1 according to this embodiment, the memory area to be allocated for the firmware storage can be reduced by about 67% compared to the comparative example.

(2) In the memory system 1 according to this embodiment, the firmware for the plurality of slots is stored in one block, so that a utilization efficiency of the block allocated for storing the firmware can be improved.

Figure 13A:
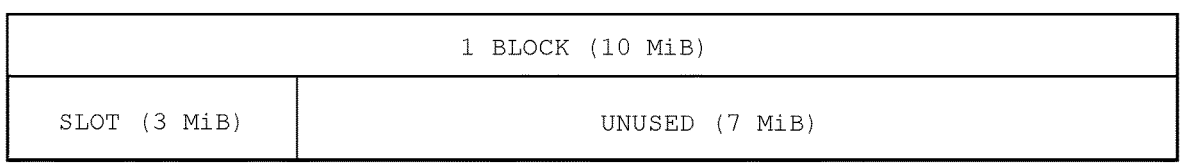
FIG. 13A is a diagram schematically illustrating an example of a usage status of the memory block in the comparative example.
Figure 13B:
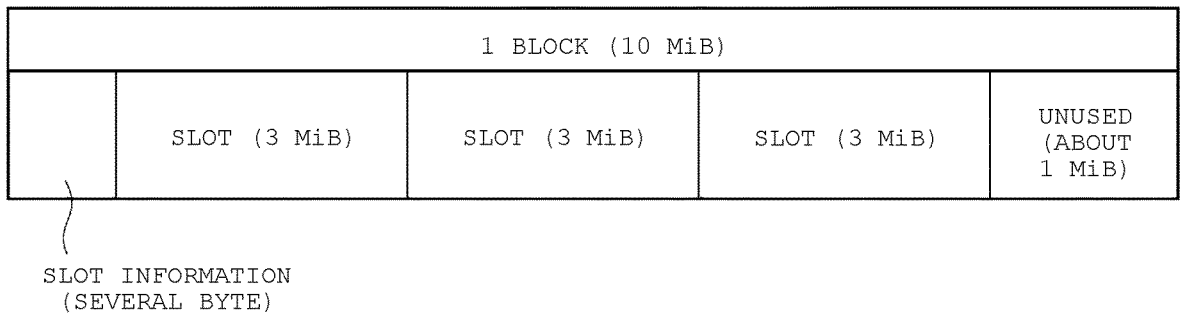
FIG. 13B is a diagram schematically illustrating an example of a usage status of the memory block in the embodiment.

FIG. 13A schematically illustrates an example of the usage status of a memory block in the comparative example. FIG. 13B schematically illustrates an example of the usage status of a memory block in the embodiment.

As illustrated in the figures, it is assumed that the storage capacity of one block is 10 MiB, the size of one slot is 3 MiB, and the size of the active slot information is several bytes. As illustrated in FIG. 13A, in the comparative example, the memory block includes the unused area of about 7 MiB. In contrast, in the memory system 1 according to this embodiment, as illustrated in FIG. 13B, the unused area can be reduced to about 1 MiB.

(3) In the memory system 1 according to this embodiment, in the case where the firmware itself is changed, the case where the active slot is changed, or the case where both the firmware itself and the active slot are changed, the number of blocks needed to be rewritten is equal to the multiplicity number.

For this reason, for example, when changing the firmware itself, the writing of 12 blocks is required in the comparative example, whereas the writing of 4 blocks is sufficient in the memory system 1 according to this embodiment. That is, the memory system 1 according to this embodiment can reduce the number of written blocks. As a result, in the memory system 1 according to this embodiment, the write time can be expected to be shortened by about 67%.

Furthermore, in the memory system 1 according to this embodiment, since the number of blocks required to be written or erased when updating the firmware is reduced, deterioration of the blocks can be reduced, and the life of the memory system can be extended.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

For example, the number of slots provided in one block is not limited to three, and may be changed appropriately as necessary. Furthermore, the multiplicity number is not limited to four, and may be changed appropriately as necessary.

What is claimed is:

1. A memory system connectable to a host, comprising:
a semiconductor memory including a plurality of blocks, each of the plurality of the blocks being a unit of a data erase operation and including at least a first area and a plurality of slots, the plurality of blocks including at least a first block, the plurality of slots of the first block storing a plurality of firmwares respectively, the first area of the first block storing active slot information indicating an active slot among the plurality of slots of the first block; and
a memory controller electrically connected to the semiconductor memory and configured to:
upon receiving a command from the host, the command instructing to update one or more of the plurality of firmwares stored in the plurality of slots of the first block,
change at least one of the plurality of firmwares stored in any one of the plurality of slots of the first block; and
change the active slot information stored in the first area of the first block.

2. The memory system according to claim 1, wherein the plurality of firmwares stored in the plurality of slots of the first block are different from one another.

3. The memory system according to claim 1, wherein
the plurality of slots of each of the plurality of blocks include at least a first slot and a second slot,
the plurality of firmwares include at least a first firmware and a second firmware,
before the memory controller receives the command from the host, the first slot of the first block stores the first firmware, and the second slot of the first block stores the second firmware, and
the memory controller is configured to:
upon receiving the command from the host,
read the first firmware from the first slot of the first block;
read the second firmware from the second slot of the first block;
execute the data erase operation on the first block;
change the read first firmware;
write the changed first firmware to the first slot of the first block; and
write the read second firmware, which is unchanged, to the second slot of the first block.

4. The memory system according to claim 1, wherein
the plurality of slots of each of the plurality of blocks include at least a first slot and a second slot,
the plurality of firmwares include at least a first firmware and a second firmware,
before the memory controller receives the command from the host, the first slot of the first block stores the first firmware, and the second slot of the first block stores the second firmware, and
the memory controller is configured to:
upon receiving the command from the host,
read the active slot information from the first area of the first block;
read the first firmware from the first slot of the first block;
read the second firmware from the second slot of the first block;
execute the data erase operation on the first block;
change the read active slot information such that the active slot is changed from the first slot to the second slot;
write the changed active slot information to the first area of the first block;
write the read first firmware, which is unchanged, to the first slot of the first block; and
write the read second firmware, which is unchanged, to the second slot of the first block.

5. The memory system according to claim 1, wherein
the plurality of blocks further include a second block,
the plurality of slots of each of the plurality of blocks include at least a first slot and a second slot,
the plurality of firmwares include at least a first firmware and a second firmware,
before the memory controller receives the command from the host, the first slot of the first block stores the first firmware, the second slot of the first block stores the second firmware, the first slot of the second block stores a copy of the first firmware, the second slot of the second block stores a copy of the second firmware, and the first area of the second block stores a copy of the active slot information, and the memory controller is configured to:
upon receiving the command from the host,
update the first firmware stored in the first slot of the first block, and update the copy of the first firmware stored in the first slot of the second block;
update the second firmware stored in the second slot of the first block, and update the copy of the second firmware stored in the second slot of the second block; and
update the active slot information stored in the first area of the first block, and update the copy of the active slot information stored in the first area of the second block.

6. The memory system according to claim 1, wherein the memory controller is configured to change less than all of the plurality of firmwares stored in the plurality of slots of the first block.

7. The memory system according to claim 1, wherein the memory controller is configured to change any one of the plurality of firmwares stored in the plurality of slots of the first block and not to change the active slot information stored in the first area of the first block, according to the command.

8. The memory system according to claim 1, wherein
the plurality of slots of each of the plurality of blocks include at least a first slot and a second slot, and
the active slot information stored in the first area of the first block includes information relating to a boot order in which firmware stored in the second slot of the first block is booted when booting of firmware stored in the first slot of the first block fails.

9. A method of updating a firmware stored in a semiconductor memory, the semiconductor memory including a plurality of blocks, each of the plurality of the blocks being a unit of a data erase operation and including at least a first area and a plurality of slots, the plurality of blocks including at least a first block, the method comprising:
storing a plurality of firmwares in the plurality of slots of the first block respectively;
storing active slot information in the first area of the first block, the active slot information indicating an active slot among the plurality of slots of the first block;
receiving a command from a host, the command instructing to update one or more of the plurality of firmwares stored in the plurality of slots of the first block;
changing at least one of the plurality of firmwares stored in any one of the plurality of slots of the first block; and
changing the active slot information stored in the first area of the first block.

10. The method according to claim 9, wherein the plurality of firmwares stored in the plurality of slots of the first block are different from one another.

11. The method according to claim 9, wherein the plurality of slots of each of the plurality of blocks include at least a first slot and a second slot, the plurality of firmwares include at least a first firmware and a second firmware, the method further comprises:
storing the first firmware in the first slot of the first block;
storing the second firmware in the second slot of the first block;
upon receiving the command from the host,
reading the first firmware from the first slot of the first block;
reading the second firmware from the second slot of the first block;
executing the data erase operation on the first block;
changing the read first firmware;
writing the changed first firmware to the first slot of the first block; and
writing the read second firmware, which is unchanged, to the second slot of the first block.

12. The method according to claim 9, wherein the plurality of slots of each of the plurality of blocks include at least a first slot and a second slot, the plurality of firmwares include at least a first firmware and a second firmware, and the method further comprises:
storing the first firmware in the first slot of the first block;
storing the second firmware in the second slot of the first block;
upon receiving the command from the host,
reading the active slot information from the first area of the first block;
reading the first firmware from the first slot of the first block;
reading the second firmware from the second slot of the first block;
executing the data erase operation on the first block;
changing the read active slot information such that the active slot is changed from the first slot to the second slot;
writing the changed active slot information to the first area of the first block;
writing the read first firmware, which is unchanged, to the first slot of the first block; and
writing the read second firmware, which is unchanged, to the second slot of the first block.

13. The method according to claim 9, wherein the plurality of blocks further include a second block, the plurality of slots of each of the plurality of blocks include at least a first slot and a second slot, the plurality of firmwares include at least a first firmware and a second firmware, the method further comprises:
storing the first firmware in the first slot of the first block;
storing the second firmware in the second slot of the first block;
storing a copy of the first firmware in the first slot of the second block;
storing a copy of the second firmware in the second slot of the second block;
storing a copy of the active slot information in the first area of the second block;
upon receiving the command from the host,
updating the first firmware stored in the first slot of the first block, and updating the copy of the first firmware stored in the first slot of the second block;
updating the second firmware stored in the second slot of the first block, and updating the copy of the second firmware stored in the second slot of the second block; and
updating the active slot information stored in the first area of the first block, and updating the copy of the active slot information stored in the first area of the second block.

14. The method according to claim 9, wherein
the plurality of slots of each of the plurality of blocks include at least a first slot and a second slot, and
the active slot information stored in the first area of the first block includes information relating to a boot order in which firmware stored in the second slot of the first block is booted when booting of firmware stored in the first slot of the first block fails.

15. A computer-executable firmware update program for updating a firmware stored in a semiconductor memory, the semiconductor memory including a plurality of blocks, each of the plurality of the blocks being a unit of a data erase operation and including at least a first area and a plurality of slots, the plurality of blocks including at least a first block, the program being configured to cause a computer to execute:

storing a plurality of firmwares in the plurality of slots of the first block;

storing active slot information in the first area of the first block, the active slot information indicating an active slot among the plurality of slots of the first block;

receiving a command from a host, the command instructing to update one or more of the plurality of firmwares stored in the plurality of slots of the first block;

changing at least one of the plurality of firmwares stored in any one of the plurality of slots of the first block; and changing the active slot information stored in the first area of the first block.

16. The program according to claim 15, wherein the plurality of firmwares stored in the plurality of slots of the first block are different from one another.

17. The program according to claim 15, wherein the plurality of slots of each of the plurality of blocks include at least a first slot and a second slot, the plurality of firmwares include at least a first firmware and a second firmware, the program is further configured to cause the computer to execute:

storing the first firmware in the first slot of the first block;

storing the second firmware in the second slot of the first block;

upon receiving the command from the host, reading the first firmware from the first slot of the first block;

reading the second firmware from the second slot of the first block;

executing the data erase operation on the first block;

changing the read first firmware;

writing the changed first firmware to the first slot of the first block; and writing the read second firmware, which is unchanged, to the second slot of the first block.

18. The program according to claim 15, wherein the plurality of slots of each of the plurality of blocks include at least a first slot and a second slot, the plurality of firmwares include at least a first firmware and a second firmware, and the program is further configured to cause the computer to execute:

storing the first firmware in the first slot of the first block;

storing the second firmware in the second slot of the first block;

upon receiving the command from the host, reading the active slot information from the first area of the first block;

reading the first firmware from the first slot of the first block;

reading the second firmware from the second slot of the first block;

executing the data erase operation on the first block;

changing the read active slot information such that the active slot is changed from the first slot to the second slot;

writing the changed active slot information to the first area of the first block;

writing the read first firmware, which is unchanged, to the first slot of the first block; and writing the read second firmware, which is unchanged, to the second slot of the first block.

19. The program according to claim 15, wherein the plurality of blocks further include a second block, the plurality of slots of each of the plurality of blocks include at least a first slot and a second slot, the plurality of firmwares include at least a first firmware and a second firmware, the program is further configured to cause the computer to execute:

storing the first firmware in the first slot of the first block;

storing the second firmware in the second slot of the first block;

storing a copy of the first firmware in the first slot of the second block;

storing a copy of the second firmware in the second slot of the second block;

storing a copy of the active slot information in the first area of the second block;

upon receiving the command from the host, updating the first firmware stored in the first slot of the first block, and updating the copy of the first firmware stored in the first slot of the second block;

updating the second firmware stored in the second slot of the first block, and updating the copy of the second firmware stored in the second slot of the second block; and updating the active slot information stored in the first area of the first block, and updating the copy of the active slot information stored in the first area of the second block.

20. The program according to claim 15, wherein the plurality of slots of each of the plurality of blocks include at least a first slot and a second slot, and the active slot information stored in the first area of the first block includes information relating to a boot order in which firmware stored in the second slot of the first block is booted when booting of firmware stored in the first slot of the first block fails.

\* \* \* \* \*